(12) United States Patent
Sadaphal et al.

(10) Patent No.: US 9,043,647 B2
(45) Date of Patent: May 26, 2015

(54) FAULT DETECTION AND LOCALIZATION IN DATA CENTERS

(71) Applicant: TATA CONSULTANCY SERVICES LIMITED, Mumbai, Maharashtra (IN)

(72) Inventors: Vaishali Sadaphal, Pune (IN); Maitreya Natu, Pune (IN); Harrick Vin, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 137 days.

(21) Appl. No.: 13/732,697

(22) Filed: Jan. 2, 2013

(65) Prior Publication Data

US 2014/0189436 A1   Jul. 3, 2014

(51) Int. Cl.
| | | |
|---|---|---|
| *G06F 11/00* | (2006.01) | |
| *G06F 11/07* | (2006.01) | |
| *G06F 11/30* | (2006.01) | |
| *G06F 11/34* | (2006.01) | |

(52) U.S. Cl.
CPC .......... *G06F 11/0709* (2013.01); *G06F 11/079* (2013.01); *G06F 11/3093* (2013.01); *G06F 11/3419* (2013.01); *G06F 2201/81* (2013.01)

(58) Field of Classification Search
CPC ............ G06F 11/0751; G06F 11/0763; G06F 11/079; G06F 11/2257; G06F 11/3006; G06F 11/3048; G06F 11/3072; G06F 11/3089; G06F 11/3093; G06F 11/3096; G06F 11/3447
USPC .............................. 714/26, 37, 45, 47.1, 47.2
See application file for complete search history.

(56) References Cited

U.S. PATENT DOCUMENTS

| | | | |
|---|---|---|---|
| 8,751,867 B2* | 6/2014 | Marvasti et al. | 714/26 |
| 8,868,474 B2* | 10/2014 | Leung et al. | 706/12 |
| 2004/0153815 A1* | 8/2004 | Volponi | 714/37 |

(Continued)

FOREIGN PATENT DOCUMENTS

WO    WO01/27901 A1    4/2001

OTHER PUBLICATIONS

Cecchet et al.: "Performance Debugging in Data Centers: Doing More with Less"; 2009 First International Conference on Communication Systems and Networks (Comsnets 2009); Computer Science Department, University of Massachusetts at Amherst, USA, Tata Research Develpment and Design Centre (TRDDC), Tata Consultancy Services, Pune, India.

(Continued)

*Primary Examiner* — Marc Duncan
(74) *Attorney, Agent, or Firm* — Hamre, Schumann, Mueller & Larson, P.C.

(57) ABSTRACT

Systems and Methods for detection and localization of performance faults in data centers are described. In one embodiment, a method comprises identifying a performance fault in a data center upon detection of the performance fault at any of a plurality of monitors in the data center, wherein the plurality of monitors are placed at monitor nodes, amongst a plurality of nodes, in the data center. Further, the method comprises evaluating a fault vector for the data center upon identification of the performance fault, wherein the fault vector is evaluated based on a fault indicator corresponding to each of the plurality of monitors. Based on the comparison of the fault vector with signatures of each of the plurality of nodes, one or more faulty nodes, amongst the plurality of nodes in the data center, are determined as likely root cause of the performance fault.

13 Claims, 7 Drawing Sheets

(56) References Cited

U.S. PATENT DOCUMENTS

| | | | | |
|---|---|---|---|---|
| 2005/0099419 | A1* | 5/2005 | Castonguay et al. | 345/420 |
| 2005/0102566 | A1* | 5/2005 | Manley et al. | 714/25 |
| 2008/0133288 | A1* | 6/2008 | Thibaux et al. | 705/7 |
| 2010/0306597 | A1* | 12/2010 | Goldszmidt et al. | 714/47 |
| 2011/0022891 | A1* | 1/2011 | Fijany et al. | 714/26 |
| 2011/0239051 | A1* | 9/2011 | Basu et al. | 714/37 |
| 2013/0305093 | A1* | 11/2013 | Jayachandran et al. | 714/37 |
| 2014/0006330 | A1* | 1/2014 | Biem | 706/46 |

OTHER PUBLICATIONS

Natu et al.: "Probe Station Placement for Robust Monitoring of Networks"; Journal of Networks and Systems Management; vol. 16, issue 4, Dec. 2008, Dept. of Computer and Information Science, University of Delaware, Newark, DE, USA, 19716.

* cited by examiner

― 232

| Node Pair | Differential Set |
|---|---|
| (1, 2) | {1, 2, 5, 6, 8, 10} |
| (1, 3) | {1, 3, 5, 6, 7, 8, 10, 11} |
| (1, 4) | {1, 4, 5, 7, 8, 9, 11} |
| (2, 1) | {1, 2, 5, 6, 8, 10} |
| (2, 3) | {2, 3, 7, 11} |
| (2, 4) | {2, 4, 6, 7, 9, 10, 11} |
| (3, 1) | {1, 3, 5, 6, 7, 8, 10, 11} |
| (3, 2) | {2, 3, 7, 11} |
| (3, 4) | {3, 4, 6, 9, 10} |

― 234

{6, 7}

|   | 6 | 7 |
|---|---|---|
| 1 | 0 | 0 |
| 2 | 1 | 0 |
| 3 | 1 | 1 |
| 4 | 0 | 1 |

FAULT DETECTION AND LOCALIZATION IN DATA CENTERS

TECHNICAL FIELD

The present subject matter relates, in general to, fault localization and, in particular to, a system and a method for detection and localization of performance faults in data centers.

BACKGROUND

Advances in software programming and computing technology have made increasingly sophisticated and feature-rich software applications available to consumers and businesses. For businesses in particular, these powerful software applications provide benefits in terms of improved accuracy, efficiency, and convenience for numerous tasks performed on a regular basis. Today's enterprises are largely dependent on the software applications for most aspects of their businesses. Typically, large enterprises organize their computing resources into multiple data centers, each data center being a pool of computing resources and storage that may be physically separated from the other data centers. The software applications run in such data centers and end users' requests to such software applications flow into one or more data centers of the enterprise.

Most of the software applications include a large number of application components, arranged in multiple tiers and spread across multiple servers within the data centers. Smooth operation of such software applications is dependent upon successful detection and localization of performance faults that arise in the data centers during operation of such software applications. Thus, to keep such software applications continuously available, particularly those applications that are considered to be business-critical software applications, automatic and real-time detection of performance problems resulting from software or hardware faults in the data centers, and subsequent localization and correction of these faults is critical for the enterprises.

Several approaches for fault detection and localization in data centers have been proposed in the past few years. Such approaches involve introducing monitors/probes in the data centers. However, effectiveness of the fault detection and localization according to such approaches varies depending on the number of monitors, and the type of monitors introduced in the data centers.

SUMMARY

This summary is provided to introduce concepts related to detection and localization of performance faults in data centers and these concepts are further described below in the detailed description. This summary is not intended to identify essential features of the claimed subject matter nor is it intended for use in determining or limiting the scope of the claimed subject matter.

In one embodiment, a method comprises identifying a performance fault in a data center upon detection of the performance fault at any of a plurality of monitors in the data center, wherein the plurality of monitors are placed at monitor nodes amongst a plurality of nodes in the data center. Further, the method comprises evaluating a fault vector for the data center upon identification of the performance fault. Such a fault vector is evaluated based on a fault indicator corresponding to each of the plurality of monitors. Furthermore, the method comprises determining one or more faulty nodes amongst the plurality of nodes in the data center based on a comparison of the fault vector with signatures of each of the plurality of nodes, wherein the one or more faulty nodes are identified as likely root cause of the performance fault.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
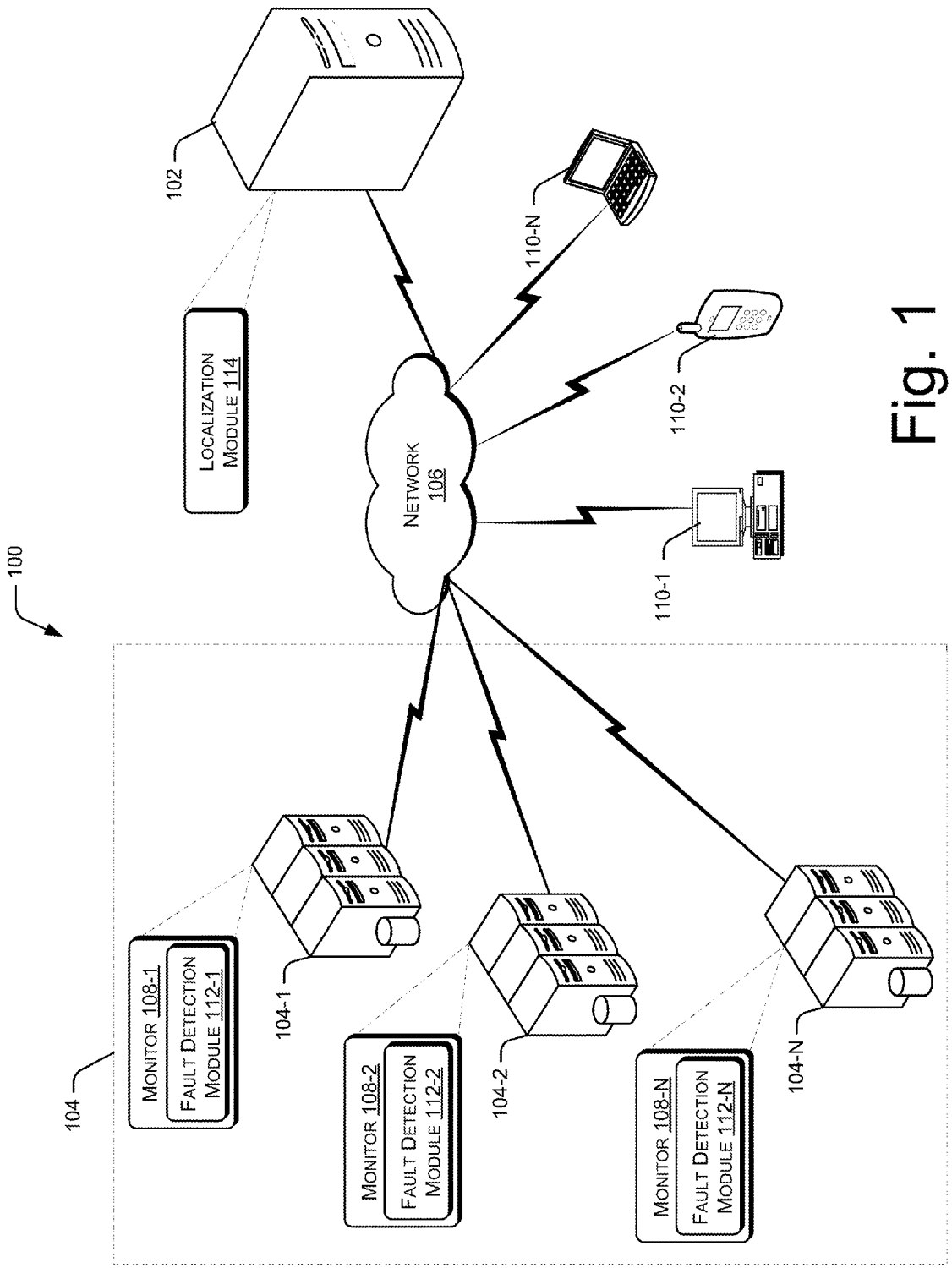
FIG. 1 illustrates a fault detection and localization system implemented in a network environment, in accordance with an embodiment of the present subject matter.

In the past few years, scale and complexity of data centers has increased rapidly. Considering an example of equity trading plant operated by a top-tier investment bank, the data center typically receives and processes millions of requests for equity trades, usually referred to as orders, and millions of market updates such as news, stock-tick updates, etc., daily. Upon arrival, each order goes through several processing steps prior to being dispatched to a stock exchange for execution. Similarly, market updates are processed, enriched, aggregated and then transmitted to thousands of program trading engines as well as traders' workstations. The data centers for processing these orders and market updates consists of thousands of application components running on several hundred servers. Orders and market updates hop from one component/server to another prior to reaching their destination.

In said example, a critical business requirement is that the end-to-end latency for processing each request should not exceed around 7 ms-10 ms. In case the end-to-end latencies start to exceed the specified threshold consistently, one needs to detect, localize and correct the performance fault rapidly, i.e., almost in near-real-time. The longer it takes to detect and localize faults, the greater is the business impact. Considering the increasing complexity of the enterprise data centers, detecting and localizing performance faults in real-time has become a challenge.

Conventional approaches for detection and localization of performance faults involve introducing monitors, typically, at each entity in the data centers, so that every entity in the data center can be monitored independently. The conventional approaches are therefore able to localize performance faults accurately and in real-time. Such conventional approaches are, however, not tenable for data centers that are large and complex because of limits imposed by enterprises on permissible amounts of instrumentation and monitoring overhead. Moreover, enterprises are reluctant to introduce monitors at each entity in the data centers, especially, if the monitors are intrusive, i.e., the monitors are likely to modify behavior of the application.

In accordance with the present subject matter, a system and a method for fault detection and localization is described. The system and the method automatically detect and localize performance faults in real-time with minimum instrumentation and intrusiveness.

The data center may include a large number of computing systems, storage systems, and communication systems. The data center may support, for example, complex distributed software applications and services. For the ease of explanation, the data center running a software application is visualized as a directed acyclic graph having a plurality of nodes and edges. The nodes in the graph represent entities, such as an application component running on several computing systems in the data center, and edges in the graph indicates flow of end users' requests to such application from one node to another node.

According to an embodiment of the present subject matter, one or more monitor nodes amongst a plurality of nodes in a data center are identified for monitor placement. A monitor node may be understood as a node, at which the monitor is to be placed. In one implementation, the identification of the monitor nodes is based on a monitor placement algorithm. The monitor placement algorithm referred herein may be a hitting set algorithm, an information entropy algorithm, or information entropy hitting set algorithm which is a combination of the hitting set algorithm and the information entropy algorithm.

According to the hitting set algorithm, differential sets are identified for each of the pair of nodes in the graph of the data center. For example, one differential set is identified for each pair of nodes in the graph. Each of the differential sets contains, for example, one or more differentiator nodes. A differentiator node may be understood as a node that is reachable from exactly one of the pair of nodes in the graph, and not both. For example, node X may be referred to as a differentiator node for a pair of nodes (A, B), if node X is reachable from exactly one of the two nodes A and B, and not both. Subsequent to the identification of the differential sets, a predefined number of common differentiator nodes are then identified. The common differentiator nodes referred herein may be understood as the nodes that are present in all the differential sets, and/or most number of the differential sets. For example, a pre-defined number, say three, common differentiator nodes that are present in all/most of the differential sets are to be identified. In said example, if there are 6 differential sets and node X is present in all 6 differential sets, nodes Y and Z are present in 5 differential sets each, and nodes P and Q are present in 4 differential sets each, then nodes X, Y and Z can be selected as the three common differentiator nodes since they are present in most differentiator sets. A set of such common differentiator nodes is hereinafter referred to as a hitting set.

According to the information-entropy algorithm, entire set of nodes in the graph are split into subsets of nodes to identify the monitor nodes. Such a splitting is performed in a plurality of iterations such that in a first iteration splitting is performed based on information entropy values of the plurality of nodes in the set, and in each of the subsequent iterations the splitting is performed based on information entropy values of the plurality nodes in respective subsets. In one implementation, the graph is recursively splits into smaller subsets to build a classification tree. For splitting the graph, an information entropy value is computed for each node in the graph. Based on the information entropy values of all the nodes, a monitor node is selected amongst the plurality of nodes in the graph. In one implementation, a node having the highest information entropy value is selected as the monitor node. Such a monitor node is then utilized to split the nodes in the graph into smaller subsets. In an example, nodes from which the monitor node is reachable forms one subset, and the nodes from which the monitor node is not reachable, forms another subset.

For each of the subsets, thus, obtained, information entropy values are calculated for the nodes in the respective subsets, and monitor nodes are identified for each of the subsets depending upon the information entropy values of the nodes in their respective subsets. The monitor node is then utilized to split each of the subsets into further subsets. Such a process of splitting the nodes in the subsets is repeated till every node can be assigned a unique signature. The signature of a node indicates reachability of all the nodes from that node. As a result of such a splitting process which is carried out at various stages, a classification tree is obtained with intermediate nodes of the classification tree representing the monitor nodes, where monitors can be placed.

According to an information entropy hitting set algorithm, a classification tree is built in a similar manner as described in case of information entropy algorithm with a slight difference in the splitting process. Unlike the information entropy algorithm, where the splitting of subsets is carried out locally based on the information entropy values of the nodes in their respective subsets, the splitting process in case of information entropy hitting set algorithm is carried out globally based on the information entropy values of the nodes in all the subsets at a given stage. In other words, a node that best hits all the subsets at a given stage is identified as a monitor node, which is used to split the subsets into further subsets till every node can be assigned a unique signature. The classification tree thus obtained indicates the intermediate nodes that represent the monitor nodes, where monitors can be placed.

Any one of the above mentioned monitor placement algorithms can be utilized to identify optimum/minimum number of monitor nodes needed for the detection and localization of the performance faults in the data center, and to identify corresponding locations of such monitor nodes in the data center. Once the monitor nodes are identified, a monitor can be placed at each of the monitor nodes.

Subsequent to the monitor placement, performance faults in the data center can be detected based on monitoring composite time series of end-to-end latencies of requests arriving at each of the monitors. For example, a significant and a persistent change in latencies of the requests may be an indication of the performance fault. In an implementation, the fault detection is carried out at each monitor using a fault detection algorithm. For example, each of the monitors placed at a corresponding monitor node is configured to detect performance fault at that monitor node or neighboring nodes, using a fault detection algorithm. Neighboring nodes referred herein may be understood as the nodes that are connected to a given monitor node via edges. The fault detection algorithm computes composite time series of end-to-end latencies at a monitor, and flags a fault indicator if a significant and persistent change in the latencies is observed at the monitor.

Based on the fault detection at each of the monitors, a fault vector for the data center is evaluated. The fault vector may be, for example, a consolidated fault indicator that indicates presence or absence of performance fault at each of the monitors. The fault vector is, for example, a K bit vector, where K represents a number of monitors. Each bit in the K bit fault vector may be set to either a binary 0 or 1, where 0 indicates a presence of fault at the corresponding monitor, and 1 indicates absence of fault at the corresponding monitor.

Based on the fault vector, fault localization is carried out using a fault localization algorithm to identify one or more faulty nodes. The faulty nodes may be understood as nodes that are identified as likely root cause of the performance fault in the data center. In one implementation, the fault localization algorithm may be a binary signature matching algorithm. According to the binary signature matching algorithm, the fault vector is compared with signatures of all the nodes. One or more nodes that closely match with the fault vector are identified as the faulty nodes. In another implementation, the fault localization algorithm may be a weighted signature matching algorithm. According to the weighted signature matching, weighted signatures of all the nodes are computed based on analyzing traffic at the nodes, and the fault vector is compared with weighted signature of all the nodes. The one or more nodes that closely with the fault vector are identified as the faulty nodes.

The system and the method, thus, provide fault localization in real-time with minimum instrumentation, i.e., minimum monitors, and monitoring overhead. The system and the method are therefore suitable to be implemented in large and/or complex data centers. Moreover, the monitors introduced in the data center, in accordance with the present subject matter, are non-intrusive.

The following disclosure describes a system and a method for detection and localization of performance faults in data centers. While aspects of the described system and method can be implemented in any number of different computing systems, environments, and/or configurations, embodiments for the skeleton based identification of individuals are described in the context of the following exemplary system(s) and method(s).

FIG. 1 illustrates a fault detection and localization system 100, in accordance with an embodiment of the present subject matter.

The fault detection and localization system 100 (hereinafter referred to as system 100) comprises a fault localization system 102 connected to a data center 104 through a network 106. The data center 104 referred herein may either be a single data center or a distributed data center comprising multiple data centers 104-1, 104-2 . . . 104-N, connected through the network 106. The system 100 further comprises a plurality of monitors 108-1, 108-2, . . . , 108-N, collectively referred to as monitors 108 and individually referred to as a monitor 108, placed at different nodes within the data center 104. In case of the distributed data center 104, each of the data centers 104-1, 104-2 . . . 104-N, may have one or more monitors 108.

In the context of the present subject matter, each of the monitors 108 functions as a fault detection system that is capable of detecting performance faults occurring at the node where the monitor is placed or neighboring nodes.

Furthermore, the system 100 may include a plurality of user devices 110-1, 110-2, . . . , 110-N, that are collectively referred to as user devices 110 and individual referred to as a user device 110, in the forthcoming description. The user devices 110 are communicatively connected to the data center 104 through a network 106. In one implementation, a user's request to a software application is received from the user device 110. Such a request is processed by the data center 104. The request, for example, enters through one of the nodes in the data center 104, flows through several nodes and finally exits through one of the nodes in the data center 104. As described previously, each node in the data center 104 represents an entity in the data center 104, and edges between the nodes indicates flow of the request from one node to another node.

In one implementation, the fault localization system 102 and the monitors 108 may be implemented in a variety of computing devices, including servers, a desktop personal computer, a notebook or portable computer, a workstation, a mainframe computer, and a laptop. Further, in one implementation, the fault localization system 102 may be a distributed or centralized network system in which different computing devices may host one or more of the hardware or software components of the fault localization system. In said implementation, the user devices 110 may be implemented in a variety of computing devices, including, servers, a desktop personal computer, a notebook or portable computer, a workstation, a mainframe computer, a laptop and/or communication device, such as mobile phones and smart phones.

The network 106 may be a wireless network, a wired network, or a combination thereof. The network 106 can also be an individual network or a collection of many such individual networks, interconnected with each other and functioning as a single large network, e.g., the Internet or an intranet. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 106 may include network devices, such as network switches, hubs, routers, for providing a link between the fault localization system 102, the data center 104, the monitors 108, and the user devices 110. The network devices within the network 106 may interact with the fault localization system 102, the data center 104, the monitors 108, and the user devices 110 through the communication links.

According to the present subject matter, the monitors 108 placed at a corresponding monitor nodes includes fault detection modules 112-1, 112-2, . . . 112-N, collectively referred to as fault detection modules 112, and individually referred to as a fault detection module 112, hereinafter.

The fault detection module 112 of a monitor 108, which is placed at a monitor node, is configured to detect the performance fault at that monitor node or neighboring nodes. As indicated previously, the neighboring nodes may be understood as the nodes that are connected to a given monitor node via edges. The fault detection module 112, for example, computes a composite time series of end-to-end latencies of end user's requests passing through the monitor node. The fault detection module 112, thereafter detects a significant and a persistent change in the computed latencies. If the significant and persistent change in the latencies is detected, the fault detection module 112 flags a fault at the monitor 108 via a flag indicator. The flag indicator may be, for example, a binary one bit vector that can be set to either 0 or 1, where 0 indicates absence of fault at the monitor 108, and 1 indicates presence of fault at the monitor 108.

Subsequent to the fault detection, the fault localization system 102 is configured to localize faults in the data center 104. For example, upon detection of the fault at any one of the monitors 108, the localization module 114 within the fault localization system 102 is trigged to identify one or more faulty nodes that are potential root cause of the fault. To identify the faulty nodes, the localization module 114 evaluates a fault vector based on a presence or absence of performance faults detected at each of the monitors 108. The fault vector is, for example, a K bit vector, where K represents a number of monitors 108. Each bit in said K bit fault vector indicates presence or absence of fault at the corresponding monitor 108.

Based on the fault vector, the localization module 114 is configured to identify one or more faulty nodes. The localization module 114 may utilize, for example, a fault localization algorithm to identify the faulty nodes. The fault localization algorithm may be a binary signature matching algorithm, or a weighted signature matching algorithm. Both single as well as multiple performance faults at a given time can be detected using the fault localization algorithm.

According to the binary signature matching algorithm, the localization module 114 is configured to compare the evaluated fault vector with signatures of all the nodes in the data center 104 to identify one or more faulty nodes. Signature of a node may be understood as all the nodes that are reachable from that node. If the evaluated fault vector matches with a signature of a node, the node is identified as a faulty node by the localization module 114.

According to weighted signature matching algorithm, the localization module 114 is configured to compute weights for the bits in the evaluated fault vector based on analyzing network traffic at the nodes. Based on the computed weights, the localization module 114 determines weighted signatures of the nodes, and compares the evaluated fault vector with the weighted signatures of the nodes. If the comparison indicates a match, the associated node is identified as the faulty node by the localization module 114.

Thus, the performance faults in a large and/or complex data center 104 can easily be localized to few nodes, in accordance with the present subject matter. Once localized, the performance faults can be immediately rectified by the enterprise for smooth and delay-free operation of the software applications, which helps in meeting the service level agreements (SLA) requirements.

Figure 2A:
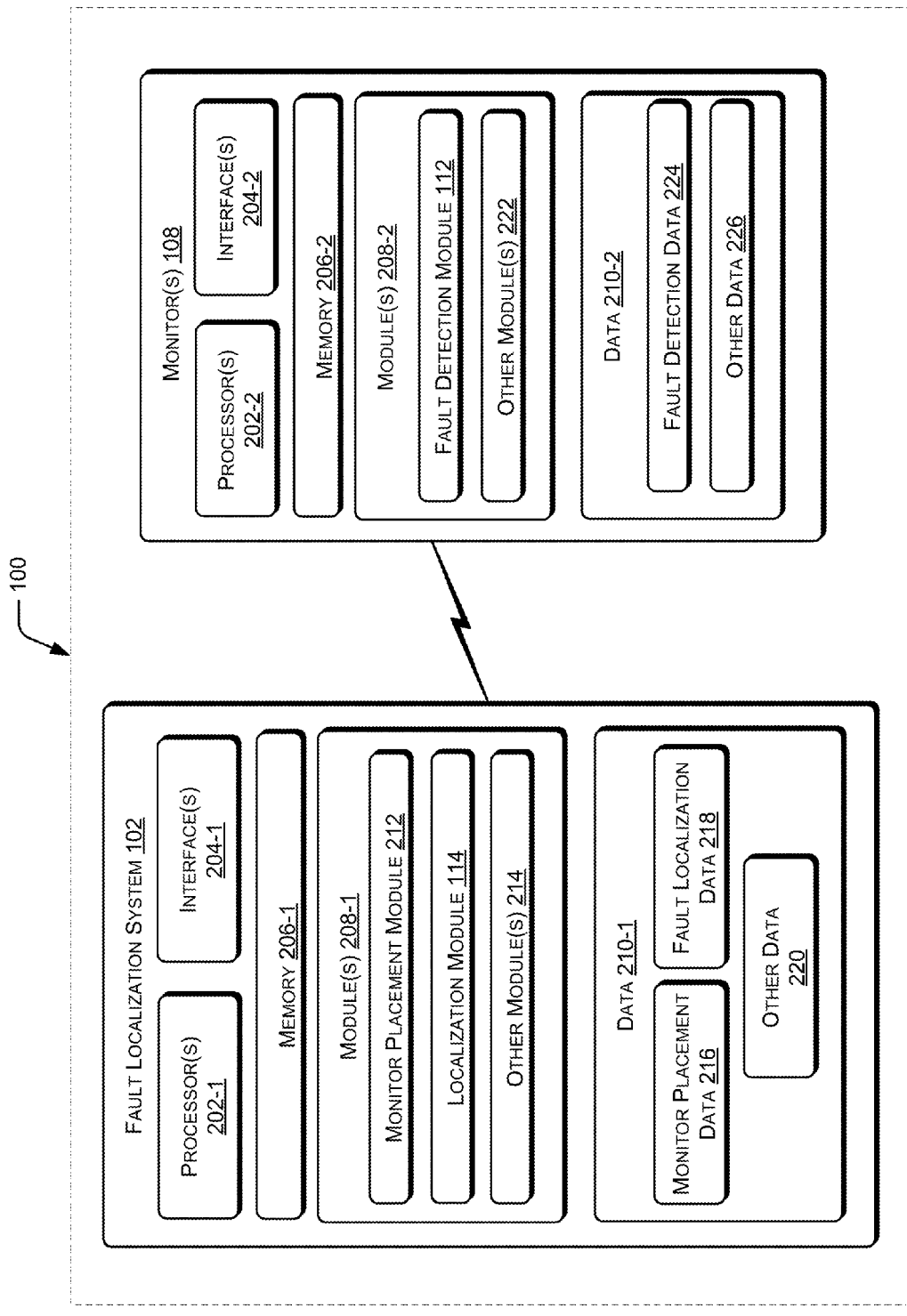
FIG. 2(a) illustrates components of the fault detection and localization system, in accordance with an embodiment of the present subject matter.

FIG. 2(a) illustrates components of the fault detection and localization system 102, according to an embodiment of the present subject matter.

In said embodiment, the fault localization system 102, and each of the monitors 108 includes one or more processor(s) 202-1 and 202-2, interface(s) 204-1 and 204-2, and a memory 206-1 and 206-2 coupled to the processor(s) 202-1 and 202-2 respectively. For the sake of brevity, the processor(s) 202-1 and 202-2 are referred to as processor(s) 202, the interface(s) 204-1 and 204-2 are referred to as interface(s) 204, and the memory 206-1 and 206-2 is referred to as memory 206.

The processor(s) 202 may be implemented as one or more microprocessors, microcomputers, microcontrollers, digital signal processors, central processing units, state machines, logic circuitries, and/or any devices that manipulate signals based on operational instructions. Among other capabilities, the processor(s) 202 are configured to fetch and execute computer-readable instructions and data stored in the memory 206.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

The interface(s) 204 may include a variety of software and hardware interfaces, for example, interface for peripheral device(s), such as a keyboard, a mouse, an external memory, and a printer. Further, the interface(s) 204 may enable the fault localization system 102, and the monitor 108, to communicate over the network 106, and may include one or more ports for connecting the fault localization system 102 and the monitor 108 with other computing devices, such as web servers and external databases. The interface(s) 204 may facilitate multiple communications within a wide variety of protocols and networks, such as a network, including wired networks, e.g., LAN, cable, etc., and wireless networks, e.g., WLAN, cellular, satellite, etc.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The fault localization system 102 and the monitor(s) 108 further include module(s) 208-1 and 208-2, and data 210-1 and 210-2 respectively.

The module(s) 208-1 and 208-2 include routines, programs, objects, components, data structures, etc., which perform particular tasks or implement particular abstract data types.

The module(s) 208-1 further include a monitor placement module 212, the localization module 114, and other module(s) 214, and the module(s) 208-2 further include the fault detection module 112, and the other module(s) 222.

The data 210-1 and 210-2 serves, amongst other things, as a repository for storing data processed, received and generated by one or more of the module(s) 208-1 and 208-2. The data 210-1 includes monitor placement data 216, fault localization data 218, and other data 220, and the data 210-2 includes fault localization data 224, and other data 226. The other data 220 and 226, includes data generated as a result of the execution of one or more other module(s) 214 and 222, respectively.

According to the present subject matter, the fault localization system 102 identifies one or more monitor nodes amongst a plurality of nodes in the data center 104 for placement of the monitors 108. Once the monitor nodes are identified, the monitors 108 can be placed at the monitor nodes. Each of the monitors 108 is configured to detect the performance fault at the monitor node where the monitor 108 is placed or its neighboring nodes. Upon detection of performance fault (interchangeably referred to as fault) at the monitors 108, the monitors 108 are configured to flag the fault. When fault is detected at any of the monitors 108, the fault localization system 102 is triggered to find one or more faulty nodes that are likely the root cause of the fault.

The manner in which monitor placement, fault detection, and fault localization takes place shall be explained in greater detail in the following subsections, "Monitor Placement", "Fault Detection", and "Fault Localization".

Monitor Placement

In operation, the monitor placement module 212 within the fault localization system 102 identifies the monitor nodes amongst the plurality of nodes in the data center 104. As indicated previously, the monitor nodes are the nodes that are potential candidates for the placement of the monitors 108. The monitor placement module 212 is configured to identify such monitor nodes based on a monitor placement algorithm, such as a hitting set algorithm, an information entropy algorithm, or information entropy hitting set algorithm.

According to the hitting set algorithm, the monitor placement module 212 identifies differential sets for each pair of nodes in the data center 104. Each of the differential sets contains, for example, one or more differentiator nodes. As indicated previously, a differentiator node may be understood as a node that is reachable from exactly one of the pair of nodes in the graph, and not both. Upon identification of the differential sets, the monitor placement module 212 identifies the common differentiator nodes that are present in most of the differentials sets as monitor nodes, where the monitors 108 can be placed. A set of such monitor nodes is referred to as hitting set.

Figure 2B:
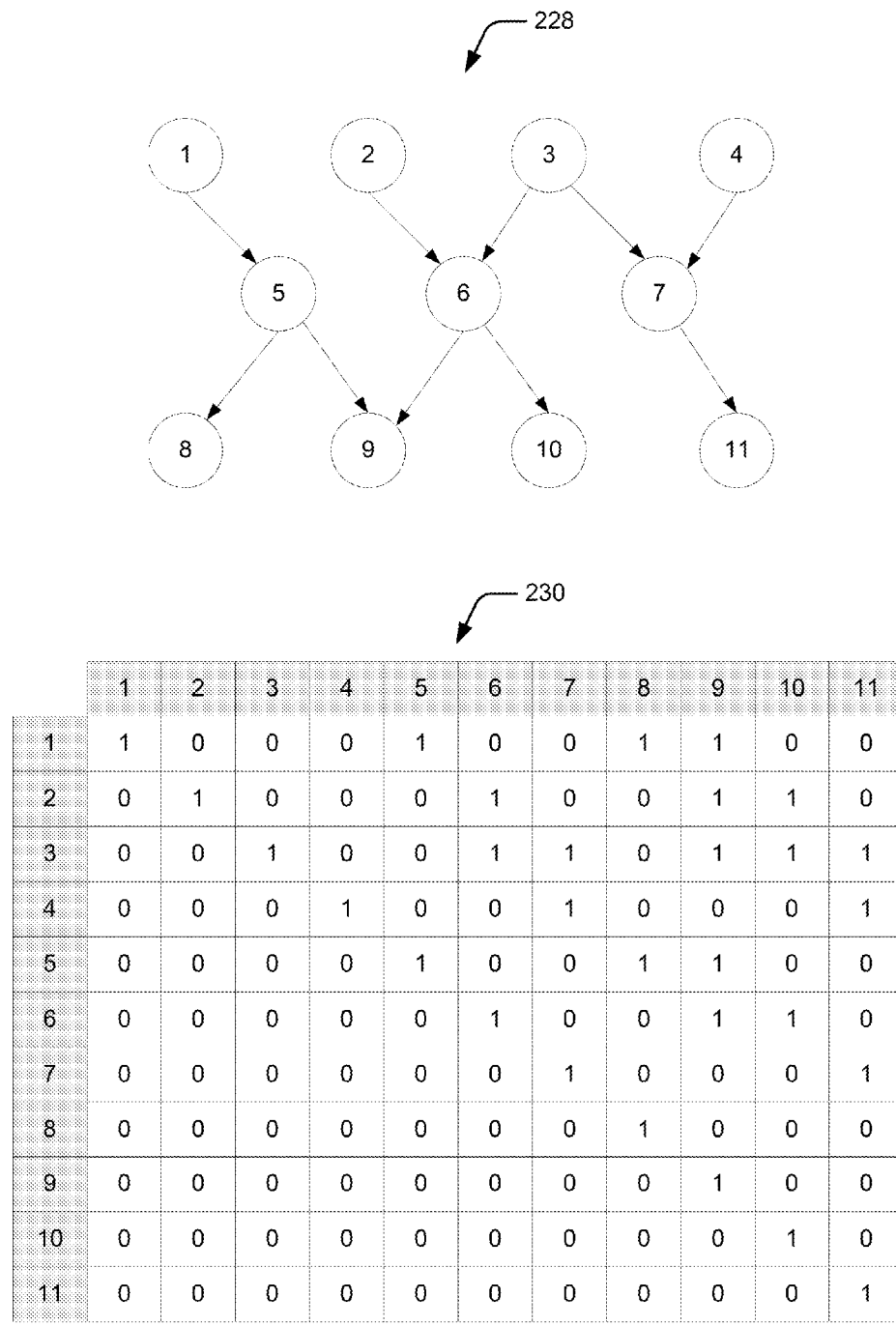
FIG. 2(b) illustrates an exemplary graph of a data center running a software application.

FIG. 2(b) illustrates an exemplary graph 228 of the data center 104 running a software application. As shown in the FIG. 2(b), the graph 228 contains 11 nodes, and a matrix 230 depicts signatures of such nodes. The edges between the 11 depict flow of end users' requests to the software application, from one node to the other node. As indicated previously, signature of a node is a set of all the nodes that are reachable from that node. As an instance, referring to the matrix 230, the signature of the node 1 is {1, 0, 0, 0, 1, 0, 0, 1, 1, 0, 0}, which indicates that the nodes 1, 5, 8 and 9 are reachable from the node 1. Likewise, other rows of the matrix 230 indicate signatures of remaining nodes.

Figure 2C:
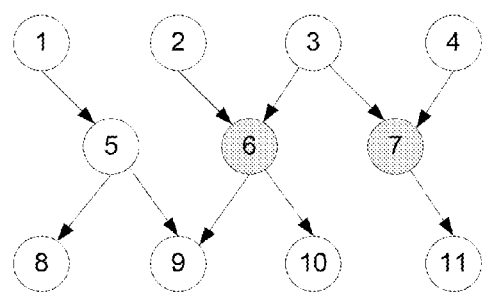
FIGS. 2(c)-2(e) illustrate working of different monitor placement algorithms with reference to the exemplary graph of the data center.

Considering the graph 228, working of the hitting set algorithm is explained in greater detail with reference to FIG. 2(c). As shown in the FIG. 2(c), the table 232 depicts the differential sets for each pair of nodes in the graph 228. For the sake of brevity, differential sets with respect to only four target nodes {1, 2, 3, 4} are described. Once the differential sets are obtained, the nodes that are present in most of the differentials sets are identified as monitor nodes, where the monitors 108 can be placed. As shown in the table 232, the nodes 6 and 7 are identified as the monitor nodes, where the monitors 108 can be placed. Alternatively, nodes 10 and 11 that are equally good candidates to be identified as the monitor nodes. Table 234 illustrates signatures of the nodes {1, 2, 3, 4} with respect to monitor node 6 and 7. As clearly depicted from the table 234, a unique signature of all the nodes can be obtained using the hitting set algorithm.

According to the information-entropy algorithm, the monitor placement module 212 computes information entropy values for all the nodes in the data center 104 using a conventionally known method for information entropy calculation. Based on the information entropy values, the monitor placement module 212 selects a monitor node amongst the plurality of nodes in the data center 104. In one implementation, a node having highest information entropy value is selected as the monitor node by the monitor placement module 212. The monitor node, thus selected, is then utilized to split the nodes into two subsets of nodes. One subset may include, for example, nodes from which the monitor node is reachable, and the other subset may include, for example, nodes from which the monitor node is not reachable.

For each of the subsets, the monitor placement module 212 further computes the information entropy values for the nodes in the respective subsets, and selects a monitor node for each of the subsets depending upon the information entropy values of the nodes in their respective subsets. The monitor nodes, thus selected, are then utilized to split each of the respective subsets into further subsets. Such a process of splitting the nodes in the subsets into further subsets is repeated till every node can be assigned a unique signature. As a result, a classification tree can be obtained with intermediate nodes of the classification tree representing the monitor nodes, where the monitors 108 can be placed.

Figure 2D:
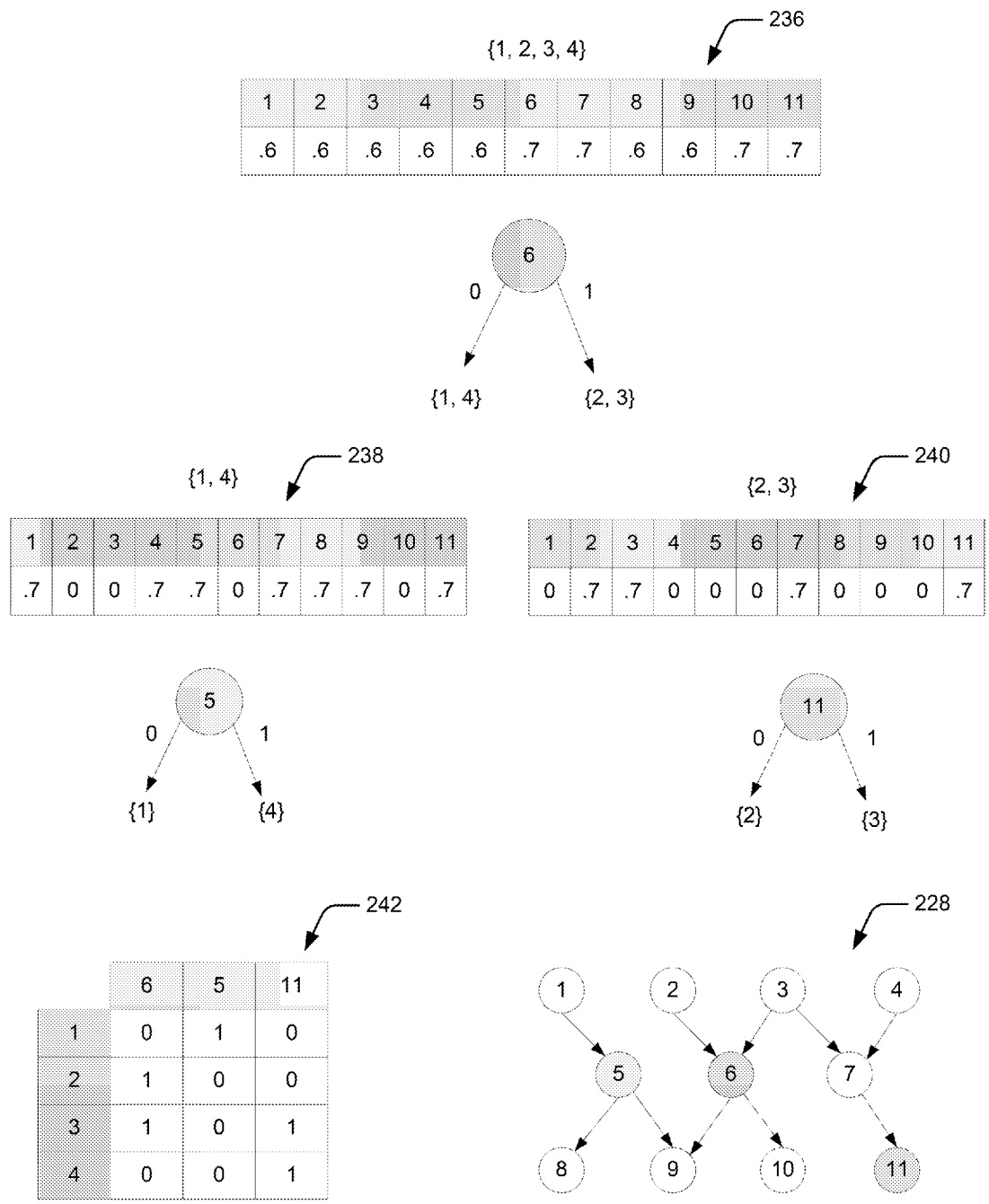

Continuing with the exemplary graph 228 provided in the FIG. 2(b), working of the information entropy algorithm is explained in greater detail with reference to FIG. 2(d). Table 236 shown in the FIG. 2(d) depicts the information entropy values for all the nodes in the graph 228. Based on the information entropy values, a node having highest information entropy value is identified as the monitor node. According to the information entropy values shown in table 236, one of the nodes 6, 7, 10, and 11 can be randomly picked as a monitor node. In said example, node 6 is picked as the monitor node, which is thereafter utilized to split the target nodes {1, 2, 3, 4} in the graph 228 is split into two subsets {1, 4} and {2, 3}.

For splitting each of the two subsets {1, 4} and {2, 3} into further subsets, information entropy values are computed for all the nodes in the respective subsets {1, 4} and {2, 3}. The information entropy values for the subsets {1, 4} is shown in the table 238, and the information entropy values for the subset {1, 4} is shown in the table 240. Based on the information entropy values, the nodes 5 and 6 are identified as the monitor nodes, which is used to split the respective subsets {1, 4} and {2, 3}. As shown in the FIG. 2(d), monitor node 5 splits the subset {1, 4} into further subsets {1} and {4}, and the monitor node 11 splits the subset {2, 3} into further subsets {2} and {3}. Unique signatures of the target nodes {1, 2, 3, 4}, thus obtained, is shown in the table 242. Thus, monitors can be placed at the monitor nodes 5, 6 and 11.

According to an information entropy hitting set (IEHS) algorithm, the monitor placement module 212 builds a classification tree in a similar manner as described in case of information entropy algorithm with a slight difference in the splitting process. Unlike the information entropy algorithm, where the splitting of subsets is carried out locally based on the information entropy values of the nodes in their respective subsets, the splitting process in case of the IEHS algorithm is carried out globally based on the information entropy values of the nodes in all the subsets at a given stage. In other words, a node that best hits all the subsets at a given stage is identified as a monitor node by the monitor placement module 212, where the identified monitor node is subsequently utilized to split the subsets into further subsets till every node can be assigned a unique signature. The classification tree, thus, obtained indicate the intermediate nodes that represents the monitor nodes, where monitors 108 can be placed.

Figure 2E:
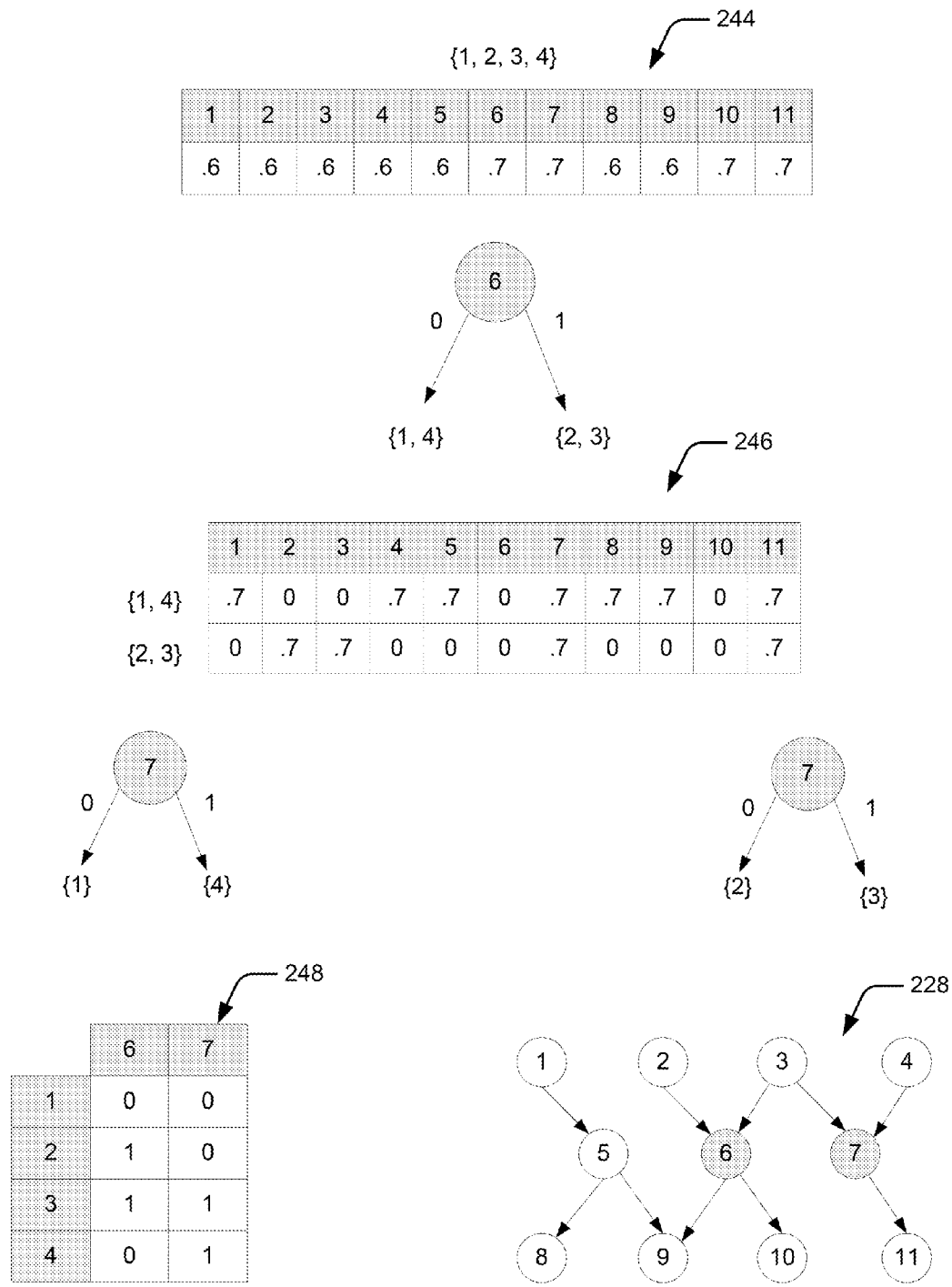

Continuing with the exemplary graph 228 provided in the FIG. 2(b), working of the IEHS algorithm is explained in greater detail with reference to FIG. 2(e). Table 244 shown in the FIG. 2(e) depicts the information entropy values for all the nodes in the graph 228. Based on the information entropy values, a node having highest information entropy value is identified as the monitor node. According to the information entropy values shown in the table 244, one of the nodes 6, 7, 10, and 11 can be randomly picked as a monitor node. In said example, node 6 is picked as the monitor node, which is thereafter utilized to split the target nodes {1, 2, 3, 4} in the graph 228 is split into two subsets {1, 4} and {2, 3}.

For splitting each of the two subsets {1, 4} and {2, 3} into further subsets, information entropy values are computed for all the nodes in the respective subsets {1, 4} and {2, 3}. Based on the collated information entropy values of the nodes in both the sets, the node having highest information entropy value in both the sets is identified as the monitor node. The collated information entropy values are depicted in the table 246. As shown in the table 246, node 7 having a highest information entropy values in both the sets is identified as a monitor node, which is subsequently utilized to split the subsets {1, 4} and {2, 3} into further subsets {1} and {4}, and {2} and {3}. Unique signatures of the target nodes {1, 2, 3, 4}, thus obtained, is shown in the table 248. According to said example, the monitors 108 can be placed at the monitor nodes 6 and 7.

The monitor placement module 212 may utilize any of the above mentioned monitor placement algorithms to identify optimum number of monitor nodes needed for the fault location, and corresponding locations of such monitor nodes in the data center 104. In an example, details of the identified monitor nodes and its corresponding locations may be stored as the monitor placement data 216 within the fault localization system 102. At each of the identified monitor nodes, the monitor 108 can placed that act as a probe for detecting faults at that node or the neighboring nodes.

Fault Detection

In operation, the fault detection module 112 within each of the monitors 108 placed at the monitor nodes is configured to detect a performance fault at that monitor node or neighboring nodes. For detecting the fault, the fault detection module 112 computes a composite time series of end-to-end latencies of end user's requests passing through the monitor node. Once the latencies are computed, the fault detection module 112 detects a significant and persistent change in the latencies.

For detecting a significant and persistent change in the latencies, the fault detection module 112 divides the computed latencies into a plurality of observation windows of a preset window size. The fault detection module 112 then compares the latencies in each of the observation windows with latencies in a previous observation window using a significance test, such as Student t-test. The Student t-test computes the probability of similarity, which is represented as p-value, in the latencies in both the observation windows. If a p-value is less than a predefined similarity threshold, a significant change in the latencies is determined by the fault detection module 112.

Once the significant change is detected, the fault detection module 112 further determines whether the detected significant change is persistent or not. To determine the persistency of the change, the fault detection module 112 maintains a change counter, and updates the change counter every time when a significant change is detected. For example, the change counter may initially be set to a default value, say, 0. After detection of a significant change, the fault detection module 112 may update the counter with a value 1. When the counter exceeds a predefined persistency threshold, the fault detection module 112 detects the significant change as a persistent change. Accordingly, the fault detection module 112 detects the fault at the monitor 108. In one implementation, fault indicators corresponding to each of the monitors 108 can be stored within the respective monitors 108 as the fault detection data 224.

In an implementation, the fault detection module 112 is configured to automatically tune parameters, such as similarity threshold and the window size, depending upon attributes of operational/production data required for processing the end user's request. Such attributes may include, but not limited to, volume of the data, and type of data. For example, if a volume of the data is more than a predefined volume threshold, the window size may be increased.

For tuning the similarity threshold, the fault detection module 112 computes the p-value by running Student t-test on observation windows of a normal behavior data. The normal behavior data mentioned herein refers to the historical data collected at the time when the system performance is fine or within acceptable limits. The p-value, thus obtained, represents the expected amount of similarity between two current observation windows. This p-value is used as the similarity threshold. The similarity threshold can be further tuned based on a user input of a changed intensity parameter. The changed intensity parameter may have a value between 0 and 1. The similarity threshold can be set to a fraction change intensity of the computed p-value. In one implementation, the similarity threshold can be tuned to the fraction change intensity based on the amount of change to be detected. A smaller value, say value closer to 0, of change intensity parameter decreases the similarity threshold. A smaller similarity threshold ignores small changes and detects only large enough changes. On the other hand, setting the value of the change intensity parameter close to 1 allows detection of even small changes.

For tuning the window size in a composite time series of end-to-end latencies of the requests consisting of multiple distributions, i.e., multiple request types, the fault detection module 112 estimates the number of distributions present in the current observation window using a conventionally known expectation maximization algorithm. The expectation maximization algorithm estimates the number of distributions n, and the parameters ($\mu$, $\sigma_i$, $w_i$) of each distribution i, where $\mu$, $\sigma_i$, and $w_i$ are mean, standard deviation, and weight of each distribution. The weight of a distribution is the fraction of total points in the observation window that belong to the distribution.

In an example, let $W_{min}=\min(w_i)\Pi_i\epsilon(1 \ldots n)$ be the minimum of the weights of all the requests. In said example, size of the observation window is defined as, window size=(MinDataPoints/$W_{min}$), where MinDataPoints is the minimum number of data points of a request type that should be present in the observation window so that an increase in its latency values is detected by the expectation maximization algorithm. A value of MinDataPoints>=1000 suffices to capture the data properties of a request type.

In one implementation, the tuning of the above mentioned parameters may take place at predefined time intervals. In another implementation, the tuning of the parameters may take place at the initiation of the fault detection algorithm. In yet another implementation, the tuning of the parameters may take place automatically when a change is detected in the data properties.

Upon detection of the fault at a monitor 108, the fault detection module 112 is configured to flag a fault at the monitor 108. In one implementation, a flag indicator can be associated with each of the monitors 108. Such a flag indicator may be preset to a default value, say, 0 that indicates absence of fault. Upon detection of the fault at the monitor 108, the fault detection module 112 may set the fault indicator to a value 1, which indicates presence of the fault at the monitor 108.

Fault Localization

Once a performance fault is detected at any of the monitors 108, the localization module 114 within the fault localization system 102 is triggered to identify one or more faulty nodes that are likely root cause of the fault. In one implementation, the localization module 112 evaluates a fault vector for the data center 104 based on the fault indicators associated with each of the monitors 108. The fault vector is indicative of the consolidated fault indicators identified at the monitors 108. The fault vector may be, for example, a K bit vector, where K represents a number of the monitors 108. Each bit in said K bit fault vector may be set to either 0 or 1. 0 indicates a presence of fault at the corresponding monitor 108, and 1 indicates absence of fault at the corresponding monitor 108.

Based on the evaluated fault vector, the localization module 114 identifies faulty nodes amongst the plurality of nodes in the data center 104 using a fault localization algorithm. The fault localization algorithm referred herein may be a binary signature matching algorithm, or a weighted signature matching algorithm.

According to the binary signature matching algorithm, the localization module 114 compares the evaluated fault vector with signatures of all the nodes in the data center 104 to identify one or more faulty nodes. In one implementation, the nodes whose signatures match exactly with the fault vector are identified as the faulty nodes. In another implementation, the nodes whose signatures match closely with the fault vector are also identified as the faulty nodes. In order to identify closely matching nodes, a string-edit distance between a k-bit binary signature of each node and the k-bit binary fault vector is determined. The string edit distance may be understood as a count of bits in the fault vector that are different from their corresponding bits in the signature. The nodes whose signatures have a minimum string edit distance from the fault vector are identified as the faulty nodes.

In one implementation, the localization module 114 can be configured to evaluate composite signatures of a set of nodes, in addition to the single signatures, and compare the fault vector with the both the single signature and composite signature of the nodes. In said implementation, the nodes whose single signatures, or a set of nodes whose composite signatures matches exactly with the fault vector, are identified as the faulty nodes by the localization module 114.

According to weighted signature matching algorithm, weighted signatures of the nodes can be pre-computed based on analyzing traffic of on outgoing edges of the nodes. The localization module 114 of the fault localization system 102 is configured to compute weights for the bits in the evaluated fault vector based on the traffic analysis. Based on the computed weights, the localization module 114 determines a weighted fault vector. The localization module 114 then calculates a distance between the weighted fault vector and the weighted signatures of the nodes. For example, considering a weighted signature S of a node and the weighted fault vector F each of length k, distance between S and F is computed by comparing each value $S_i$ in S with the corresponding value $F_i$ in F in the following manner.

If $S_i=0$ and $F_i=0$ then Distance=0
If $S_i>0$ and $F_i>0$ then Distance=0
If $S_i=0$ and $F_i>0$ then Distance=$F_i$
If $S_i>0$ and $F_i=0$ then Distance=$S_i$ The distance with respect to each of the k bit values is then added by the localization module 114 to compute the total distance between S and F. The weighted node signatures having minimum distance from the observed fault vector are then identified as the faulty nodes by the localization module 114. In one implementation, the localization module 114 can be configured to evaluate composite weighted signatures for a set of nodes, in addition to the single signatures, and compare the fault vector with the both the single signature and composite signature of the nodes. In said implementation, the nodes whose single weighted signatures, or a set of nodes whose composite signatures matches exactly with the weighted fault vector, is identified as the faulty nodes by the localization module 114. Once the faulty nodes are identified using any of the above mentioned fault localization algorithms, the faults can rectified for smooth operation of the software applications. In one implementation, details of the faulty nodes, thus, identified can be stored within the fault localization system 102 as the fault localization data 218.

Figure 3:
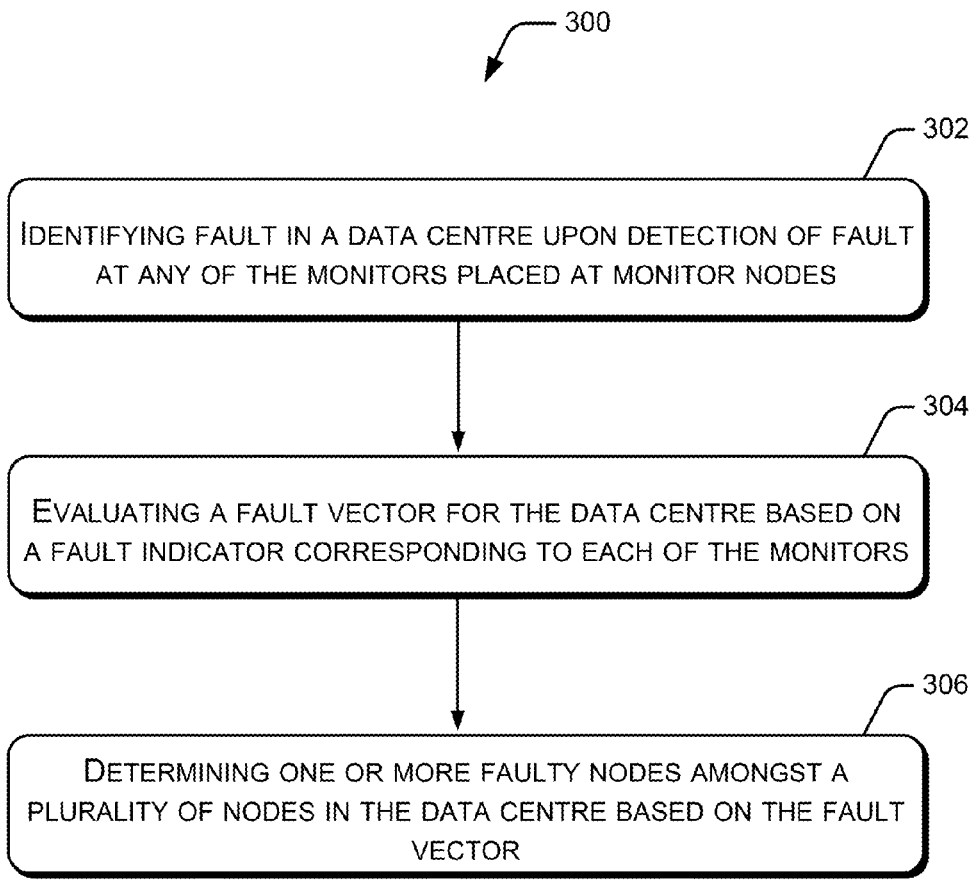
FIG. 3 illustrates a method for localization of performance faults in data centers, in accordance with an embodiment of the present subject matter.

FIG. 3 illustrates an exemplary method 300 for detection and localization of performance faults in data centers, according to an embodiment of the present subject matter, whereas the method 300 may be described in the general context of computer executable instructions. Generally, computer executable instructions can include routines, programs, objects, components, data structures, procedures, modules, functions, which perform particular functions or implement particular abstract data types. The method 300 may also be practiced in a distributed computing environment where functions are performed by remote processing devices that are linked through a communication network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300, or alternative method. Additionally, individual blocks may be deleted from the method 300 without departing from the spirit and scope of the subject matter described herein. Furthermore, the method 300 can be implemented in any suitable hardware, software, firmware, or combination thereof.

Referring to method 300, at bock 302, the method includes identifying fault in a data center upon detection of fault at any of a plurality of monitors in the data center, wherein the plurality of monitors are placed at monitor nodes amongst a plurality of nodes in the data center. As described previously, each monitor 108 is configured to detect performance fault at a monitor node where the monitor 108 is placed, or neighbouring nodes, for example, the nodes that are connected to the monitor node through edges. The monitors 108 that detects a fault, flags the fault at the monitor 108. For example, each of the monitors 108 may have a flag indicator associated therewith. When a monitor 108 detects the fault, the monitor 108 is configured to update its corresponding flag indicator to indicate a presence of fault. The flag indicator may be a binary vector that can be set to either 0 or 1, where 0 indicates absence of fault, and 1 indicates presence of fault. By default, the flag indicators of all the monitors 108 can be set to 0. When a monitor 108 detects a fault, the monitor 108 may updates the corresponding flag indicator to 1. In one implementation, when a fault is detected at any of the monitors 108, the localization module 114 detects a presence of fault in the data center 104.

At block 304, the method includes evaluating a fault vector for the data center based on a fault indicator corresponding to each of the plurality of monitors upon identifying fault in the data center. In one implementation, the localization module 114 evaluates the fault vector for the data center 104 upon identifying the fault in the data center 104. Such a fault vector is evaluated based on fault indicators associated with each of the monitors 108. The fault vector may be, for example, a K bit vector, where K represents a number of monitors 108. Each bit in said K bit fault vector may be set to either 0 or 1. 0 indicates a presence of fault at the corresponding monitor 108, and 1 indicates absence of fault at the corresponding monitor 108.

At block 306, the method includes determining one or more faulty nodes amongst the plurality of nodes in the data center based on the fault vector. In one implementation, the localization module 114 is configured to identify one or more faulty nodes that are likely to be the potential root cause of the fault, using a fault localization algorithm. The fault localization algorithm referred herein may be a binary signature matching algorithm, or a weighted signature matching algorithm.

According to the binary signature matching algorithm, the localization module 114 compares the evaluated fault vector with binary signatures of all the nodes, and identifies the nodes that match closely with the fault vector as the faulty nodes. According to the weighted signature matching algorithm, the localization module 114 evaluates a weighted fault vector and, compares the weighted fault vector with weighted signatures of the nodes. The localization module 114 then identifies the nodes that match closely with the weighted fault vector as the faulty nodes. Thus, the fault in the data center 104 is localized to a small set of nodes. The faulty nodes can thereafter be inspected and rectified by the enterprise.

Although implementations for detection and localization of performance faults in data centers have been described in language specific to structural features and/or methods, it is to be understood that the appended claims are not necessarily limited to the specific features or methods described. Rather, the specific features and methods are disclosed as exemplary implementations for the detection and localization of performance faults in data centers.

We claim:

1. A method for detection and localization of performance faults in data centers, the method comprising:
   identifying monitor nodes amongst a plurality of nodes in a data center for placement of a plurality of monitors at the monitor nodes, wherein identifying the monitor nodes is based on one of a hitting set algorithm, an information entropy algorithm, and an information entropy hitting set algorithm;
   identifying a performance fault in the data center upon detection of the performance fault at any of the plurality of monitors in the data center;
   evaluating a fault vector for the data center upon identification of the performance fault, wherein the fault vector is evaluated based on a fault indicator corresponding to each of the plurality of monitors; and
   determining one or more faulty nodes amongst the plurality of nodes in the data center based on a comparison of the fault vector with a signature of each of the plurality of nodes, wherein the one or more faulty nodes are identified as likely root cause of the performance fault.

2. The method as claimed in claim 1, wherein identifying the monitor nodes comprises:
   determining a plurality of differential sets for the plurality of nodes in the data center, wherein one differential set is determined for each pair of nodes amongst the plurality of nodes, and wherein each of the differential sets comprises one or more differentiator nodes; and
   identifying common differentiator nodes, amongst the one or more differentiator nodes in each of the differential sets, as the monitor nodes.

3. The method as claimed in claim 1, wherein identifying the monitor nodes comprises:
   splitting the plurality of nodes in a set into subsets of nodes to identify the monitor nodes,
   wherein the splitting is performed in a plurality of iterations such that in a first iteration, amongst the plurality of iterations, the splitting is performed based on information entropy values of the plurality of nodes in the set and in each subsequent iteration, amongst the plurality of iterations, the splitting is performed based on information entropy values of the plurality of nodes in respective subsets.

4. The method as claimed in claim 1, wherein identifying the monitor nodes comprises:
   splitting the plurality of nodes in a set into subsets of nodes to identify the monitor nodes,
   wherein the splitting is performed in a plurality of iterations such that in a first iteration, amongst the plurality of iterations, the splitting is performed based on information entropy values of the plurality of nodes in the set, and in each subsequent iteration, amongst the plurality of iterations, the splitting is performed based on information entropy values of the plurality nodes in each of the subsets.

5. The method as claimed in claim 1, wherein the signatures are binary signatures and the fault vector is a binary fault vector.

6. The method as claimed in claim 1, wherein the signatures are weighted signatures and the fault vector is a weighted fault vector.

7. The method as claimed in claim 1, wherein the method further comprising updating the fault indicator associated with a monitor, amongst the plurality of monitors, upon detection of the performance fault at the monitor.

8. A fault localization system comprising:
   a processor;
   a monitor placement module coupled to the processor, wherein the monitor placement module is configured to identify monitor nodes amongst a plurality of nodes in a data center for placement of a plurality of monitors at the monitor nodes based on a monitor placement algorithm, wherein the monitor placement algorithm is one of a hitting set algorithm, an information entropy algorithm, and an information entropy hitting set algorithm;
   a localization module, coupled to the processor, wherein the localization module is configured to:
   evaluate a fault vector for the data center upon detection of fault at any of the plurality of monitors in the data center;
   compare the fault vector with a signature of each of the plurality of nodes; and
   determine one or more faulty nodes amongst the plurality of nodes in the data center, based on the comparison.

9. A monitor for fault detection comprising:
   a processor;
   a fault detection module, coupled to the processor, wherein the fault detection module is configured to:
   compute composite time series of end-to-end latencies of requests passing through a monitor node in a data center, wherein the monitor node is a node in the data center where the monitor is placed;
   divide the computed composite time series of end-to-end latencies into a plurality of observation windows of a window size;
   tune the window size based on attributes of operational data required for processing the requests;
   identify a significant and a persistent change in the composite time series of end-to-end latencies based in part on comparison of the composite time series of end-to-end latencies in each of the plurality of observation windows; and
   detect a performance fault at the monitor node upon identification of the significant and the persistent change in the composite time series of end-to-end latencies.

10. The monitor as claimed in claim 9, wherein the fault detection module is configured to:
    compute a probability of similarity based on the comparison of the composite time series of end-to-end latencies in each of the plurality of observation windows; and compare the probability of similarity with a similarity threshold to identify the significant and the persistent change.

11. The monitor as claimed in claim 10, wherein the fault detection module is further configured to automatically tune the similarity threshold based on attributes of operational data required for processing the requests.

12. The monitor as claimed in claim 9, wherein the fault detection module is configured to identify the significant and the persistent change further based on comparison of a change counter with a predefined persistency threshold.

13. A non-transitory computer-readable medium having embodied thereon a computer readable program code for executing a method, the method comprising:
   identifying monitor nodes amongst a plurality of nodes in a data center for placement of a plurality of monitors at the monitor nodes, wherein the identifying the monitor nodes is based on one of a hitting set algorithm, an information entropy algorithm, and an information entropy hitting set algorithm;
   identifying a performance fault in the data center upon detection of the performance fault at any of the plurality of monitors in the data center;
   evaluating a fault vector for the data center upon identification of the performance fault, wherein the fault vector is evaluated based on a fault indicator corresponding to each of the plurality of monitors; and
   determining one or more faulty nodes amongst the plurality of nodes in the data center based on a comparison of the fault vector with a signature of each of the plurality of nodes, wherein the faulty nodes are identified as likely root cause of the performance fault.

* * * * *